(12) United States Patent
Deppieri et al.

(10) Patent No.: US 9,798,948 B2
(45) Date of Patent: Oct. 24, 2017

(54) OPTICAL CHARACTER RECOGNITION LOCALIZATION TOOL

(71) Applicant: Datalogic IP Tech, S.r.l., Bologna (IT)

(72) Inventors: Francesco Deppieri, Mira (IT); Andrea Gambini, Bologna (IT)

(73) Assignee: DATALOGIC IP TECH, S.R.L., Bologna (IT)

(*) Notice: Subject to any disclaimer, the term of this patent is extended or adjusted under 35 U.S.C. 154(b) by 0 days.

(21) Appl. No.: 14/815,741

(22) Filed: Jul. 31, 2015

(65) Prior Publication Data

US 2017/0032210 A1 Feb. 2, 2017

(51) Int. Cl.
*G06K 9/34* (2006.01)
*G06K 9/18* (2006.01)
*G06K 9/72* (2006.01)

(52) U.S. Cl.
CPC ............... *G06K 9/344* (2013.01); *G06K 9/18* (2013.01); *G06K 9/34* (2013.01); *G06K 9/348* (2013.01); *G06K 9/72* (2013.01)

(58) Field of Classification Search
None
See application file for complete search history.

(56) References Cited

U.S. PATENT DOCUMENTS 5,438,630 A * 8/1995 Chen ................... G06K 9/00463
382/159
5,497,314 A 3/1996 Novak
5,513,277 A 4/1996 Huttenlocher
5,513,304 A 4/1996 Spitz et al.
5,745,600 A 4/1998 Chen et al.
(Continued)

FOREIGN PATENT DOCUMENTS

JP 3-238573 A 10/1991
JP 2013-21519 A 1/2013
(Continued)

OTHER PUBLICATIONS

US 8,348,169, 01/2013, Wang et al. (withdrawn)
(Continued)

*Primary Examiner* — Andrae S Allison
(74) *Attorney, Agent, or Firm* — Seed IP Law Group LLP

(57) ABSTRACT

Systems and methods for processing images to recognize characters. Such may include locating background in an image which separate lines of characters, and then locating background which separate characters. The inter-character spaces within a line may be used to determine a probable inter-character spacing for the characters. Within each detected line, the character having an inter-character spacing most similar to the probable inter-character spacing may be set as a starting character for classification. Using the probable inter-character spacing and the location of the starting character, the location of a character adjacent to the starting character in a first direction may be determined and the character classified. Such process may repeat in the first direction until a first end of the line is reached. The process may then move to a character adjacent the starting character in a second direction and repeat until a second end of the line is reached.

18 Claims, 6 Drawing Sheets

(56) References Cited

U.S. PATENT DOCUMENTS

| | | | |
|---|---|---|---|
| 5,825,919 A * | 10/1998 | Bloomberg | G06K 9/00463 |
| | | | 382/171 |
| 5,848,184 A * | 12/1998 | Taylor | G06K 9/00463 |
| | | | 382/173 |
| 6,050,731 A | 4/2000 | Matsui | |
| 6,249,604 B1 | 6/2001 | Huttenlocher et al. | |
| 6,359,985 B1 * | 3/2002 | Koch | H04N 1/4486 |
| | | | 348/E7.056 |
| 6,456,393 B1 * | 9/2002 | Bhattacharjya | H04N 1/32144 |
| | | | 358/1.9 |
| 6,711,293 B1 | 3/2004 | Lowe | |
| 7,031,525 B2 | 4/2006 | Beardsley | |
| 7,118,026 B2 | 10/2006 | Harris et al. | |
| 7,422,147 B2 | 9/2008 | Rosenbaum | |
| 7,519,201 B2 | 4/2009 | Yang et al. | |
| 7,599,543 B2 | 10/2009 | Jones et al. | |
| 7,602,956 B2 | 10/2009 | Jones et al. | |
| 8,033,470 B2 | 10/2011 | Maeda et al. | |
| 8,196,822 B2 | 6/2012 | Goncalves | |
| 8,224,110 B2 | 7/2012 | Mishima et al. | |
| 8,306,318 B2 | 11/2012 | Cao et al. | |
| 8,353,457 B2 | 1/2013 | Olmstead | |
| 8,396,278 B2 | 3/2013 | Jones et al. | |
| 8,489,232 B2 | 7/2013 | Mishra et al. | |
| 8,509,534 B2 | 8/2013 | Galic et al. | |
| 8,509,537 B2 | 8/2013 | Perronnin et al. | |
| 8,538,081 B2 | 9/2013 | Ding et al. | |
| 8,542,926 B2 | 9/2013 | Panjwani et al. | |
| 8,774,510 B2 | 7/2014 | Xu et al. | |
| 8,902,760 B2 | 12/2014 | Austermann, III et al. | |
| 8,942,420 B2 | 1/2015 | Kim et al. | |
| 9,111,173 B2 | 8/2015 | Ranganathan et al. | |
| 9,239,943 B2 | 1/2016 | Svetal | |
| 2003/0210803 A1 * | 11/2003 | Kaneda | G06T 1/0028 |
| | | | 382/100 |
| 2003/0231786 A1 * | 12/2003 | Iwamura | G06T 1/0028 |
| | | | 382/100 |
| 2004/0143504 A1 | 7/2004 | Tsai | |
| 2006/0147084 A1 * | 7/2006 | Hara | G06F 17/25 |
| | | | 382/100 |
| 2007/0014429 A1 * | 1/2007 | He | G06F 17/212 |
| | | | 382/100 |
| 2007/0061226 A1 | 3/2007 | Ajiki et al. | |
| 2007/0120736 A1 | 5/2007 | MacKenzie et al. | |
| 2008/0087727 A1 | 4/2008 | Jenney et al. | |
| 2009/0084854 A1 | 4/2009 | Carlson et al. | |
| 2009/0198371 A1 | 8/2009 | Emanuel et al. | |
| 2009/0304228 A1 * | 12/2009 | Ishikawa | H04N 1/0084 |
| | | | 382/100 |
| 2011/0106653 A1 | 5/2011 | Wein | |
| 2011/0222771 A1 * | 9/2011 | Cimpoi | G06K 9/00463 |
| | | | 382/176 |
| 2011/0286628 A1 | 11/2011 | Goncalves et al. | |
| 2012/0033874 A1 | 2/2012 | Perronnin et al. | |
| 2012/0153662 A1 | 6/2012 | MacNeil et al. | |
| 2012/0187191 A1 | 7/2012 | Olmstead | |
| 2013/0001295 A1 | 1/2013 | Goncalves | |
| 2013/0020391 A1 | 1/2013 | Olmstead et al. | |
| 2013/0077873 A1 | 3/2013 | Bar Hillel et al. | |
| 2013/0259310 A1 | 10/2013 | Tsukamoto et al. | |
| 2013/0315437 A1 | 11/2013 | Kerschner et al. | |
| 2014/0029857 A1 | 1/2014 | Kompalli et al. | |
| 2014/0072217 A1 | 3/2014 | Xu et al. | |
| 2014/0112526 A1 | 4/2014 | Kim et al. | |
| 2014/0219561 A1 | 8/2014 | Nakamura | |
| 2014/0355835 A1 | 12/2014 | Rodriguez-Serrano et al. | |
| 2015/0347801 A1 | 12/2015 | Svetal | |

FOREIGN PATENT DOCUMENTS

| | | |
|---|---|---|
| JP | 2014-029608 A | 2/2014 |
| WO | 2012/103139 A2 | 8/2012 |
| WO | 2013/090023 A2 | 6/2013 |
| WO | 2013/150604 A1 | 10/2013 |

OTHER PUBLICATIONS

Misra et al, Text Extraction and Recognition from Image using Neural Network, International Journal of Computer Applications (0975-8887), vol. 40—No. 2, Feb. 2012.*

P. P. Roy, U. Pal, J. Lladós and F. Kimura, "Multi-Oriented English Text Line Extraction Using Background and Foreground Information," Document Analysis Systems, 2008. DAS '08. The Eighth IAPR International Workshop on, Nara, 2008, pp. 315-322.*

Hossain, M. Zahid, M. Ashraful Amin, and Hong Yan. "Rapid feature extraction for optical character recognition." arXiv preprint arXiv:1206.0238 (2012).Hanton et al, Alignment of Sewerage Inspection Videos for Their Easier Indexing, Computer Vision Systems, vol. 2626 of the series Lecture Notes in Computer Science pp. 141-150.*

Hanton et al, Alignment of Sewerage Inspection Videos for Their Easier Indexing, Computer Vision Systems, vol. 2626 of the series Lecture Notes in Computer Science pp. 141-150.*

Saha et al, A Hough Transform based Technique for Text Segmentation, Journal of Computing, vol. 2, Issue 2, Feb. 2010, ISSN 2151-9617.*

Dalal et al., "Histograms of Oriented Gradients for Human Detection," *Proceedings of the 2005 IEEE Computer Society Conference on Computer Vision and Pattern Recognition (CVPR'05)*, 2005, 8 pages.

Li, "Vehicle License Plate Detection and Recognition," *A Thesis presented to the Faculty of the Graduate School at the University of Missouri in Partial Fulfillment of the Requirements for the Degree of Master of Science*, Dec. 2010, 69 pages.

Newell et al., "Multiscale Histogram of Oriented Gradient Descriptors for Robust Character Recognition," *2011 International Conference on Document Analysis and Recognition*, Beijing, China, Sep. 18-21, 2011, pp. 1085-1089. (5 pages).

Partial European Search Report, dated Apr. 12, 2016, for corresponding European Application No. 15179660.4-1901/2983112, 10 pages.

Goncalves, "Robust Industrial Optical Character Recognition," Amendment, filed Jan. 13, 2016, for U.S. Appl. No. 14/450,394, 21 pages.

"Histogram of oriented gradients," Wikipedia, the free encyclopedia, retrieved on Jun. 5, 2014, from http://en.wikipedia.org/wiki/Histogram_of_oriented_gradients, 7 pages.

Dalal et al., "Histograms of Oriented Gradients for Human Detection," IEEE Computer Society Conference on Computer Vision and Pattern Recognition, San Diego, CA, Jun. 25, 2005, 8 pages.

Dollár et al., "Crosstalk Cascades for Frame-Rate Pedestrian Detection," European Conference on Computer Vision, Sep. 2012, 14 pages.

Dollár et al., "Fast Feature Pyramids for Object Detection," Submission to IEEE Transactions on Pattern Analysis and Machine Intelligence, 2014, 14 pages.

Dollár et al., "The Fastest Pedestrian Detector in the West," Proceedings of the British Machine Vision Conference, BMVA Press, Sep. 2010, 11 pages.

Dollár et al., "Integral Channel Features," British Machine Vision Conference, London, England, 2009, 11 pages.

Goncalves, "Robust Industrial Optical Character Recognition," U.S. Appl. No. 14/450,394, filed Aug. 4, 2014, 57 pages.

Goncalves, "Robust Industrial Optical Character Recognition," Office Action mailed Sep. 9, 2015, for U.S. Appl. No. 14/450,394, 7 pages.

Lowe, "Object Recognition from Local Scale-Invariant Features," Proceedings of the International Conference on Computer Vision, Sep. 1999, 8 pages.

Minetto et al., "SnooperText: A text detection system for automatic indexing of urban scenes," *Computer Vision and Image Understanding*, 2013, 13 pages.

Minetto et al., "T-HOG: an Effective Gradient-Based Descriptor for Single Line Text Regions," Preprint submitted to Pattern Recognition, Nov. 1, 2012, 36 pages.

(56) References Cited

OTHER PUBLICATIONS

Munich et al., "SIFT-ing Through Features with ViPR," IEEE Robotics & Automation Magazine, Sep. 2006, pp. 72-77.
Ott, "Segmentation Features, Visibility Modeling and Shared Parts for Object Detection," PhD thesis, The University of Leeds School of Computing, Feb. 2012, 215 pages.
Ott et al., "Implicit Color Segmentation Features for Pedestrian and Object Detection," IEEE $12^{th}$ International Conference on Computer Vision, Kyoto, Japan, Sep. 29-Oct. 2, 2009, 8 pages.
Prates et al., "Brazilian License Plate Detection Using Histogram of Oriented Gradients and Sliding Windows," *International Journal of Computer Science & Information Technology* 5(6):39-52, Dec. 2013.
Razak et al., "Off-line Handwriting Text Line Segmentation: A Review," *IJCSNS International Journal of Computer Science and Network Security* 8(7):12-20, Jul. 2008.
Svetal, "Object Recognition for Exception Handling in Automatic Machine-Readable Symbol Reader Systems," U.S. Appl. No. 14/289,950, filed May 29, 2014, 58 pages.
Svetal, "Object Recognition for Exception Handling in Automatic Machine-Readable Symbol Reader Systems," Office Action mailed Apr. 27, 2015, for U.S. Appl. No. 14/289,950, 32 pages.
Svetal, "Object Recognition for Exception Handling in Automatic Machine-Readable Symbol Reader Systems," Amendment filed Aug. 24, 2015, for U.S. Appl. No. 14/289,950, 14 pages.
Svetal, "Object Recognition for Exception Handling in Automatic Machine-Readable Symbol Reader Systems," Notice of Allowance mailed Sep. 11, 2015, for U.S. Appl. No. 14/289,950, 8 pages.
Wang et al., "Word Spotting in the Wild," Proceedings of the $11^{th}$ European Conference on Computer Vision: Part 1, Springer-Verlag Berlin, 2010, pp. 591-604.
Extended European Search Report, dated Dec. 13, 2016. For European Application No. 16181289.6-1901, 10 pages.
Ishitani, "Documents Skew Detection Based on Local Region Complexity," Proceedings of the Second in International Conference on Document Analysis and Recognition, Tsukuba Science City, Japan, pp. 49-52, 1993, 4 pages.
Shridhar et al., *Handbook of Character Recognition and Document Image Analysis*, World Scientific Publishing Co. Pte. Ltd., River Edge, NJ, 1997, pp. 123-156, Chapter 5, "Segmentation-Based Cursive Handwriting Recognition," 34 pages.
Srihari et al., *Handbook of Character Recognition and Document Image Analysis*, World Scientific Publishing Co. Pte. Ltd., River Edge, NJ, 1997, pp. 357-380, Chapter 13, "Research in Japanese OCR," 24 pages.

\* cited by examiner

OPTICAL CHARACTER RECOGNITION LOCALIZATION TOOL

BACKGROUND

Technical Field

The present disclosure generally relates to computer vision, and in particular relates to optical character recognition.

Description of the Related Art

Optical character recognition (OCR) is the mechanical or electronic conversion of scanned or photographed images of alphanumeric or other characters into machine-encoded/computer-readable alphanumeric or other characters. OCR is used as a form of data entry from some sort of original data source, such as product packaging (e.g., a bag of chips, a box), books, receipts, business cards, mail, or any other object having characters printed or inscribed thereon. OCR is a common method of digitizing printed characters so that the characters can be electronically identified, edited, searched, stored more compactly, displayed on-line, or used in machine processes such as machine translation, text-to-speech, verification, key data extraction and text mining.

Typically, the OCR process can be viewed as a combination of two main sub-processes: (1) localization or segmentation and (2) recognition or classification. The segmentation sub-process locates and "isolates" the individual characters. The recognition or classification sub-process classifies the characters in question and assigns to each character a corresponding alpha-numerical or other character or symbol. The OCR process is typically divided into two sub-processes because the classification sub-process is computationally expensive, and therefore it is advantageous that the classification sub-process not be done throughout an entire image, but rather only at select locations where the segmentation sub-process has detected a potential character. For high quality images, characters are well separated and segmentation sub-process becomes relatively straightforward. However, often images suffer from perspective distortion, curved surfaces, low contrast, high degree of noise, character variation, character skew, variable spacing, background variation, or other non-ideal factors. These factors complicate the segmentation sub-process, and segmentation errors lead to the failure in the recognition sub-process.

Machine-readable symbol readers or scanners may be employed to capture images or representations of characters appearing on various surfaces. One commonly used machine-readable symbol reader is an imager- or imaging-based machine-readable symbol reader. Imaging-based machine-readable symbol readers typically employ flood illumination to simultaneously illuminate the characters, either from dedicated light sources, or in some instances using ambient light.

Machine-readable symbol readers may be fixed, for example, readers may be commonly found at supermarket checkout stands or other point of sale locations. Machine-readable symbol readers may also be handheld (e.g., handheld readers or even smartphones), or mobile (e.g., mounted on a vehicle such as a lift vehicle or a forklift).

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the characters or symbols to be recognized. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode characters or machine-readable symbols.

BRIEF SUMMARY

An image processor system may be summarized as including at least one processor; and at least one nontransitory processor-readable storage medium communicatively coupled to the at least one processor and which stores at least one of processor-executable instructions or data, wherein in use the at least one processor: receives an image file from the at least one nontransitory processor-readable storage medium, the image file comprising a two-dimensional array of pixels, each of the pixels having a pixel value; partitions the image file into a two-dimensional array of regions comprising a number of rows and a number of columns, each of the regions comprising a plurality of the pixels; for each region, determines a characteristic value indicative of whether the region contains foreground or background; analyzes the determined characteristic values of the regions to identify one or more lines of characters; for each line of the identified one or more lines of characters, analyzes the determined characteristic values for the regions within the line to determine a probable inter-character spacing; identifies a starting character region based at least in part on the determined characteristic values and the determined probable inter-character spacing; and recognizes a character within the starting character region. The at least one processor may, for each line of the identified one or more lines of characters, identify an adjacent character region which is adjacent the starting character region based at least in part on the determined probable inter-character spacing; and recognize a character within the adjacent character region. The at least one processor may, for each line of the identified one or more lines of characters, iteratively identify character regions adjacent a previously identified character region based at least in part on the determined probable inter-character spacing and a location of the previously identified character region; and recognize a character within each of the identified character regions. The at least one processor may, for each column, analyze the determined characteristic values of the regions in the column to identify transitions between foreground and background; and compare the identified transitions in adjacent columns to identify the one or more lines of characters. The at least one processor may compare the identified transitions in adjacent columns to identify a probable angle of orientation for the identified one or more lines of characters. The at least one processor may, for each line of the identified one or more lines of characters, analyze the determined characteristic values to detect transitions between foreground and background; and compare the detected transitions with the determined probable inter-character spacing to identify the starting character region. The at least one processor may, for each line of the identified one or more lines of characters, sum the characteristic values of the regions within each column within the line to generate an intensity profile for the line; and analyze the intensity profile to determine the probable inter-character spacing. The at least one processor may, for each line of the identified one or more lines of characters, analyze the intensity profile to identify transitions between foreground and background; determine a most frequent distance between the identified transitions between foreground and background; and select the determined most frequent distance as the probable inter-character spacing. The at least one processor may input image data corresponding to the starting character region into a trained classifier to recognize a character within the starting character region.

A method of operation in an image processor system for recognizing one or more characters in an image file, the image file including a two-dimensional array of pixels, each of the pixels having a pixel value, may be summarized as including receiving, by at least one processor, the image file from at least one nontransitory processor-readable storage medium communicatively coupled to the at least one processor; partitioning, by the at least one processor, the image file into a two-dimensional array of regions comprising a number of rows and a number of columns, each of the regions comprising a plurality of the pixels; for each region, determining, by the at least one processor, a characteristic value indicative of whether the region contains foreground or background; analyzing, by the at least one processor, the determined characteristic values of the regions to identify one or more lines of characters; for each line of the identified one or more lines of characters, analyzing, by the at least one processor, the determined characteristic values for the regions within the line to determine a probable inter-character spacing; identifying, by the at least one processor, a starting character region based at least in part on the determined characteristic values and the determined probable inter-character spacing; and recognizing, by the at least one processor, a character within the starting character region.

The method may further include for each line of the identified one or more lines of characters, identifying, by the at least one processor, an adjacent character region which is adjacent the starting character region based at least in part on the determined probable inter-character spacing; and recognizing, by the at least one processor, a character within the adjacent character region.

The method may further include for each line of the identified one or more lines of characters, iteratively identifying, by the at least one processor, character regions adjacent a previously identified character region based at least in part on the determined probable inter-character spacing and a location of the previously identified character region; and recognizing, by the at least one processor, a character within each of the identified character regions. Analyzing the determined characteristic values of the regions to identify one or more lines of characters may include for each column, analyzing, by the at least one processor, the determined characteristic values of the regions in the column to identify transitions between foreground and background; and comparing, by the at least one processor, the identified transitions in adjacent columns to identify the one or more lines of characters.

The method may further include comparing, by the at least one processor, the identified transitions in adjacent columns to identify a probable angle of orientation for the identified one or more lines of characters. Identifying a starting character region may include, for each line of the identified one or more lines of characters, analyzing, by the at least one processor, the determined characteristic values to detect transitions between foreground and background; and comparing, by the at least one processor, the detected transitions with the determined probable inter-character spacing to identify the starting character region. Analyzing the determined characteristic values for the regions within the line to determine a probable inter-character spacing may include, for each line of the identified one or more lines of characters, summing, by the at least one processor, the characteristic values of the regions within each column within the line to generate an intensity profile for the line; and analyzing, by the at least one processor, the intensity profile to determine the probable inter-character spacing.

Analyzing the determined characteristic values for the regions within the line to determine a probable inter-character spacing may further include, for each line of the identified one or more lines of characters, analyzing, by the at least one processor, the intensity profile to identify transitions between foreground and background; determining, by the at least one processor, a most frequent distance between the identified transitions between foreground and background; and selecting, by the at least one processor, the determined most frequent distance as the probable inter-character spacing. Recognizing a character within the starting character region may include inputting, by the at least one processor, image data corresponding to the starting character region into a trained classifier to recognize a character within the starting character region.

An image processing system may be summarized as including at least one processor; and at least one nontransitory processor-readable storage medium communicatively coupled to the at least one processor and which stores at least one of processor-executable instructions or data, wherein in use the at least one processor: partitions an image file into a two-dimensional array of regions comprising a number of rows and a number of columns, each of the regions comprising a plurality of pixels each including a pixel value; for each region, determines a characteristic value indicative of whether the region contains foreground or background; for each column, analyzes the determined characteristic values of the regions in the column to identify transitions between foreground and background; compares the identified transitions in adjacent columns to identify one or more lines of characters; compares the identified transitions in adjacent columns to identify a probable angle of orientation for the identified one or more lines of characters; for each line of the identified one or more lines of characters, analyzes the determined characteristic values to detect transitions between foreground and background, the transitions being horizontal with respect to the identified probable angle of orientation for the identified one or more lines of characters; analyzes the transitions between foreground and background to determine a probable inter-character spacing; compares the detected transitions with the determined probable inter-character spacing to identify a starting character region; and recognizes a character within the starting character region. The at least one processor may, for each line of the identified one or more lines of characters, identify an adjacent character region which is adjacent the starting character region based at least in part on the determined probable inter-character spacing; and recognize a character within the adjacent character region. The at least one processor may, for each line of the identified one or more lines of characters, iteratively identify character regions adjacent a previously identified character region based at least in part on the determined probable inter-character spacing and a location of the previously identified character region; and recognize a character within each of the identified character regions. The at least one processor may, for each line of the identified one or more lines of characters, sum the characteristic values of the regions within each column within the line to generate an intensity profile for the line; and analyze the intensity profile to determine the probable inter-character spacing. The at least one processor may, for each line of the identified one or more lines of characters, analyze the intensity profile to identify transitions between foreground and background;

determine a most frequent distance between the identified transitions between foreground and background; and select the determined most frequent distance as the probable inter-character spacing. The at least one processor may input image data corresponding to the starting character region into a trained classifier to recognize a character within the starting character region.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
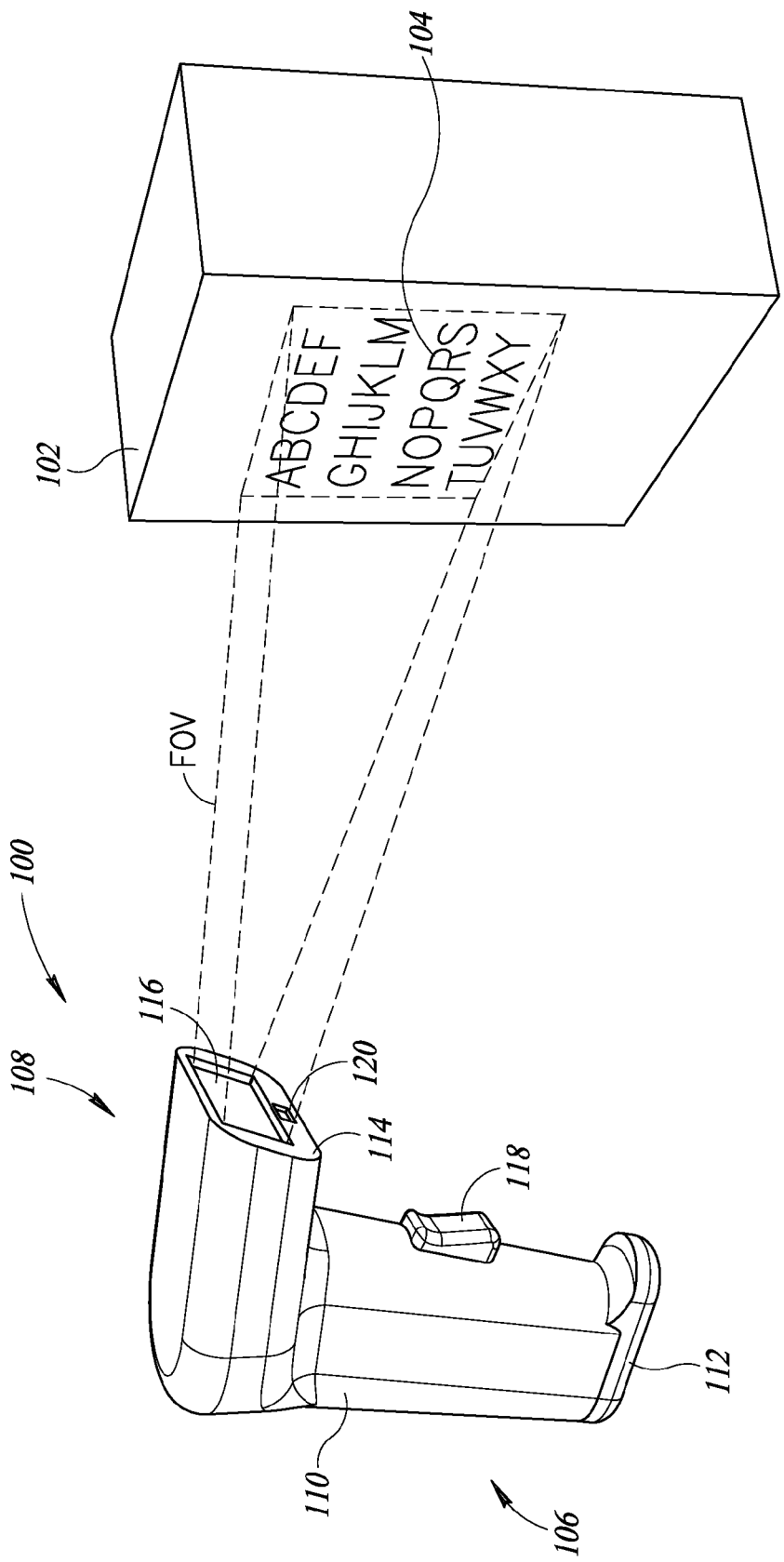
FIG. 1 is a perspective view of a machine-readable symbol reader and target object, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with machine-readable symbol readers, computer systems, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Implementations of the present disclosure are directed to systems and methods for processing video or image data to locate and recognize characters therein. As discussed below, such is achieved by first searching and locating background areas in an image which separate lines of characters (inter-line spaces or gaps), and second by searching and locating background areas which separate individual characters (inter-character spaces or gaps). The detected inter-character spaces within a line of characters may be used to determine a probable inter-character spacing for the characters in that line of characters. Within each detected line of characters, the character having an inter-character spacing relative to adjacent characters which is most similar to the determined probable inter-character spacing may be determined to be a starting character which is classified first using any suitable classifier (e.g., decision tree, neural network, support vector machine, k-nearest neighbor). After the starting character is classified, the position and/or shape of character box for that character may be refined using the specific classified character. Such allows for greater precision when estimating the location of an adjacent character box. For example, the character "i" is much narrower than many other characters, so by using the character's precise location and/or shape, the spacing between the character and an adjacent character may be more accurately determined after the classifier has recognized the character. Each character "box" may be a generic shape of a number (e.g., 4) of sides, dependent on the tilt, skew, geometric distortion, etc., of the character. Such allows for high performance classification even under poor acquisition conditions.

Using the determined probable inter-character spacing and the actual location of the classified starting character, the location of a character adjacent to the starting character in a first direction (i.e., left, right) may be determined so that the adjacent character may be classified. This process may repeat in the first direction until a first end of the line of characters is reached. The process may then move to a character adjacent to the starting character in a second direction opposite the first direction and repeat the locating and classifying acts until a second end of the line of characters is reached.

FIG. 1 shows a handheld machine-readable symbol reader or scanner 100 acting upon a target object 102 labeled with multiple lines of characters 104 (e.g., alphanumeric). The reader or scanner 100 may be an imaging based machine-readable symbol reader, for example. The handheld machine-readable symbol reader 100 includes a gripping portion 106 shaped and sized to be grasped by an operator's hand and a scanning head portion 108 extending from an upper portion 110 of the gripping portion. A lower portion 112 of the gripping portion 106 may be shaped and sized to be received in a docking station (not shown). The machine-readable symbol reader 100 includes a front wall region 114 on the scanning head portion 108. The scanning head portion 108 also includes a transparent window 116 present on the front wall 114 behind which is positioned an image formation subsystem, as discussed below.

The machine-readable symbol reader 100 may be used in at least one of a handheld mode or a fixed position mode. In the fixed position mode, the reader 100 may be received in a docking station and the target object 102 having characters 104 may be brought within the angular field of view (FOV) of the machine-readable symbol reader to have the reader 100 read or detect the characters 104. In the handheld mode, the reader 100 may be carried by an operator and positioned such that the surface of the target object 102 carrying the characters 104 is within the field of view (FOV) of the reader. In the handheld mode, imaging and decoding of the target characters 104 may be initiated by the operator depressing a trigger 118, for example.

For the purpose of this description, a handheld imaging based machine-readable symbol system is discussed. However, it will be apparent to one of ordinary skill in the art that the techniques and devices described herein can be practiced advantageously with stationary, bi-optic, or other types of readers, scanners, cameras, or image processor systems.

The machine-readable symbol reader 100 may also include an aiming subsystem 120, for example, positioned on the front wall 114 of the scanning head portion 108 of the reader. The aiming subsystem 120 may also be positioned behind the window 116 adjacent the image formation subsystem. The aiming subsystem may project an aiming pattern (not shown for clarity) which allows the operator to aim the machine-readable symbol reader 100 toward the characters 104 provided on the surface of the target object 102.

Figure 2:
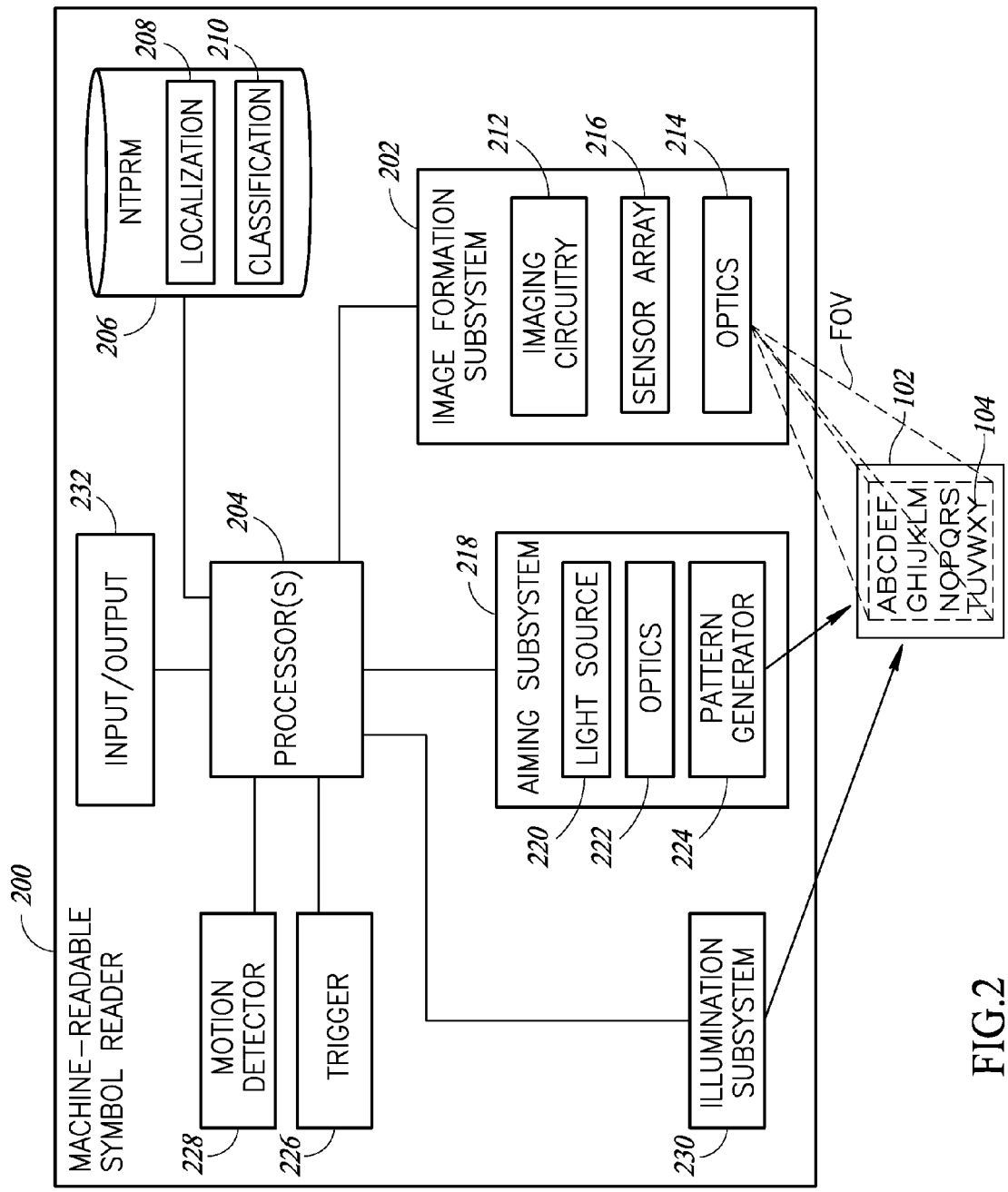
FIG. 2 is a functional block diagram of a machine-readable symbol reader, according to one illustrated implementation.

FIG. 2 is a block diagram of an imaging based machine-readable symbol reader 200 in accordance with at least some implementations of the present disclosure. The machine-readable symbol reader 200 may be similar or identical to the machine-readable symbol reader 100 of FIG. 1. The machine-readable symbol reader 200 includes an image formation subsystem 202 which captures image frames of graphical indicia such as the characters 104 of FIG. 1 present in the field of view (FOV) of the image formation subsystem 202. The reader 200 also includes one or more processors 204 operatively coupled to a nontransitory processor-readable storage medium 206 which stores OCR localization logic 208 and OCR classification logic 210. Execution of the OCR localization logic 210 by the processor 204 causes the processor 204 to localize individual characters in a digital image, as discussed below. Execution of the OCR classification logic 208 by the processor 204 causes the processor 204 to classify or recognize characters within a localized region of a digital image, as discussed below. The OCR localization logic 208 and the OCR classification logic 210 may be executed by the one or more processors 204, for example, implementing a method 300 of FIG. 3. In some implementations, one or both of the OCR localization logic 208 and the OCR classification logic 210 are implemented by multiple processors, by hardware, or by any combination thereof. Generally, the OCR localization logic 208 and the OCR classification logic 210 may be implemented in any suitable manner, including hardware, software, electrical circuitry, firmware, on an application specific integrated circuit (ASIC), on a programmable gate array (PGA), or any combination thereof.

The image formation subsystem 202 includes imaging circuitry 212, imaging or receiving optics 214 including one or more imaging or focusing lens, and an image sensor or pixel array 216. The focusing lens of the receiving optics 214 focuses light reflected and scattered from the target characters 104 through an aperture onto the pixel/image sensor array 216. Thus, the receiving optics 214 focus an image of the target characters 104 (assuming the characters are within the FOV) onto the array of pixels comprising the pixel array 216, thereby enabling the pixel array to capture an image of a target object 102 within a FOV of the image formation subsystem during an exposure period. The FOV of the image formation subsystem 202 may be a function of both the configuration of the sensor array 216 and the optical characteristics of the receiving optics 214 and the distance and orientation between the array 216 and the receiving optics.

The sensor array 216 may include a charged coupled device (CCD), a complementary metal oxide semiconductor (CMOS), or other imaging pixel array, operating under the control of the imaging circuitry 212.

The machine-readable symbol reader 200 includes an aiming subsystem 218 to generate the visible aiming pattern to aid the operator in aiming the machine-readable symbol reader 200 at the target characters 104. In some implementations, the aiming subsystem 218 may include a light source 220 (e.g., one or more LEDs, lasers, superluminescent diodes), a focusing lens 222 (e.g., collimator) and a pattern generator 224 (e.g., beam shaper) for generating the desired aiming pattern.

In some implementations, the aiming pattern is used by the operator to focus on the target characters 104. Upon focusing, the operator depresses a trigger 226 to read or capture an image of the target characters 104. In some implementations, the machine-readable symbol reader 200 has a two-position trigger 226, where the first position activates the aiming subsystem 218 and the second position activates scanning. In some implementations, the machine-readable symbol reader 200 includes a motion detector 228 (e.g., accelerometer) that is used to activate the aiming subsystem 218 upon detection of movement of the reader, which may signify that an operator has picked up the reader for a scanning operation.

In some implementations, the machine-readable symbol reader 200 may also include a flood illumination system 230 to illuminate the target characters 104. The flood illumination system 230 may direct a flood illumination pattern towards the target characters 104. The illumination from the flood illumination system 230 may be reflected by the target characters 104. The reflected light then passes through the imaging lens 214 and is focused onto the sensor array 216 of the image formation subsystem 202.

As discussed further below, the OCR localization logic 208 and the OCR classification logic 210 may process images captured by the image formation subsystem 202 to recognize characters. If the recognition process is successful, data representative of the recognized characters 104 may then be output via a data input/output system 232, which may include one or more of a wired/wireless communications port, a display, LEDs, an audio output, touchscreen, keys, buttons, etc. Upon a successful imaging and recognizing of the characters 104, the input/output system 232 may provide feedback to the operator in the form of a visual indicator and/or an audible indicator.

Figure 3:
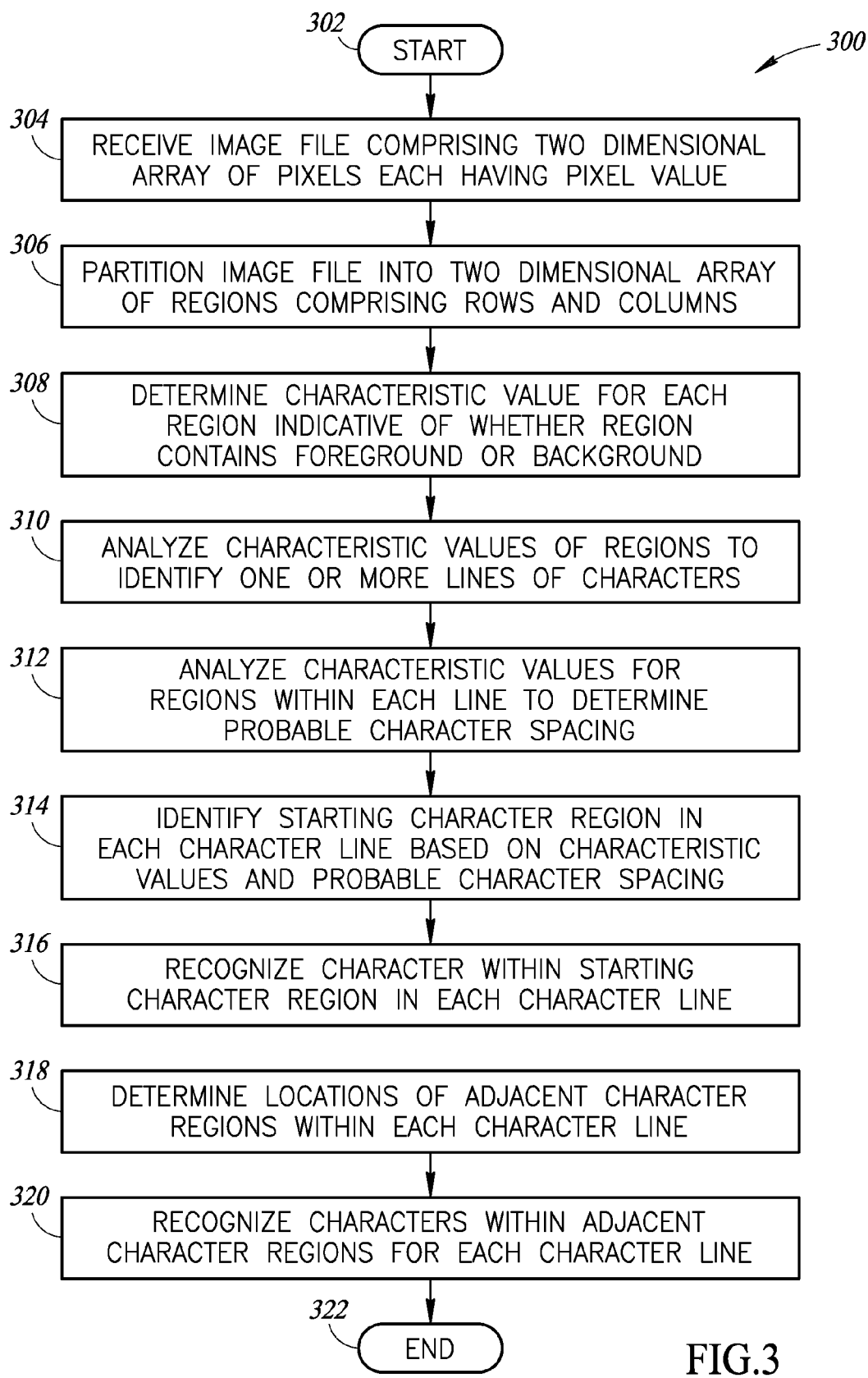
FIG. 3 is a flow diagram of a method of operation for an image processor system to recognize a plurality of characters represented in a digital image, according to one illustrated implementation.

FIG. 3 shows a method 300 for an image processor system to recognize characters in a plurality of lines of characters in a digital image. The method 300 may be implemented using any suitable image processor system. For example, the method 300 may be executed by a machine-readable symbol reader, such as the machine-readable symbol readers 100 and 200 of FIGS. 1 and 2, respectively.

The method 300 is discussed below with reference to FIGS. 4A-4B and 5-7. The method 300 begins at 302, for example, when a user picks up a machine-readable symbol reader to scan characters (e.g., alphanumeric) placed on a target object or item (e.g., clothing, packaging, circuit board, driver's license, retail item, book).

At 304, at least one processor of the image processor system receives an image file from the at least one nontransitory processor-readable storage medium. For example, the image processor system may retrieve an image file from storage, memory or a buffer. The image file may include a two-dimensional array of pixels. Each of the pixels may have a pixel value, such as a grayscale value.

Figure 4A:
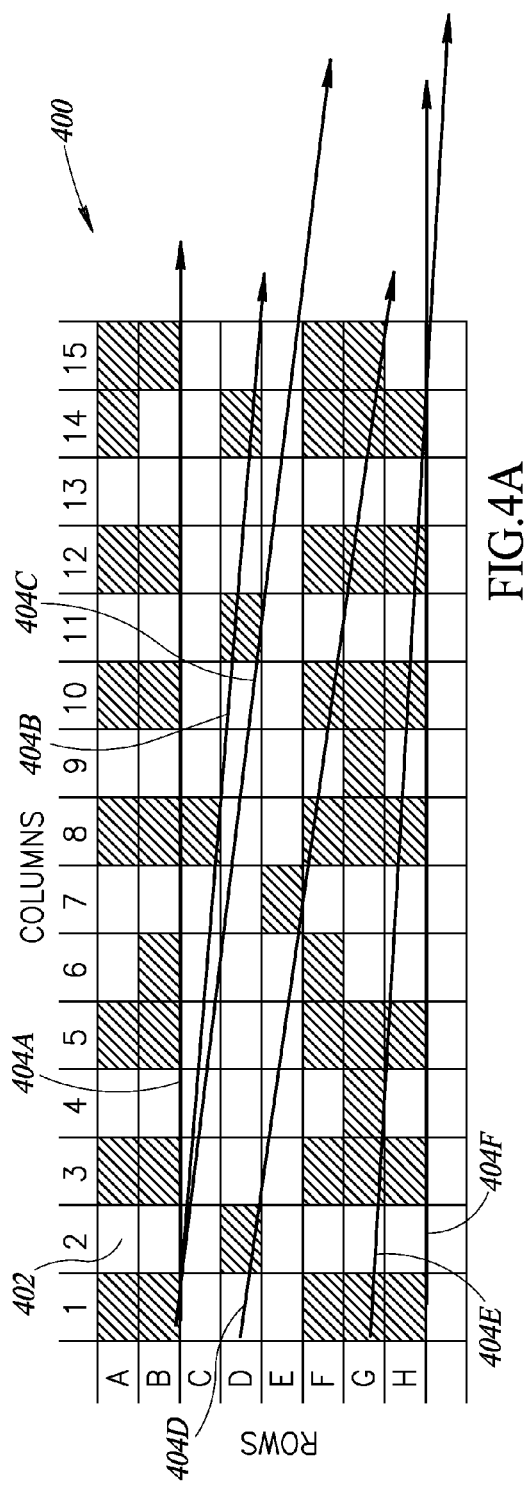
FIG. 4A is a diagram of a two-dimensional array of regions of an image which is used to detect one or more lines of characters in an image, according to one illustrated implementation.
Figure 4B:
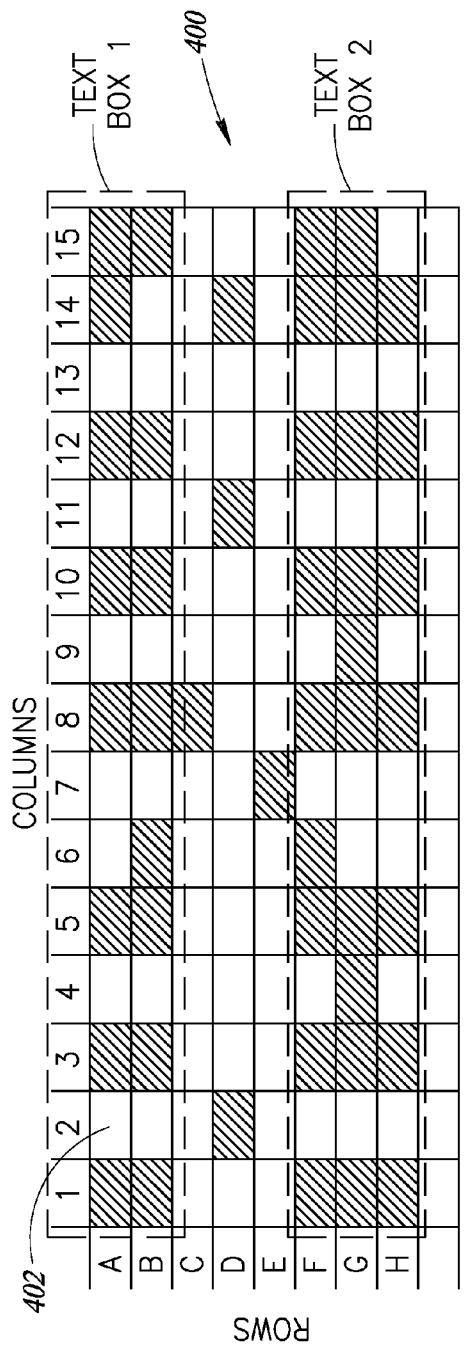
FIG. 4B is a diagram of the two-dimensional array of regions of FIG. 4B which shows two identified text boxes which correspond to respective detected lines of characters in an image, according to one illustrated implementation.

At 306, the at least one processor of the image processor system divides or partitions the image file into a two-dimensional array of regions. FIGS. 4A and 4B show an example two-dimensional array 400 of regions 402. The array 400 includes a number of rows A-H and a number of columns 1-15 of regions 402. Each of the regions 402 includes a plurality of the pixels. For example, an image may be divided into an array having eight columns and 128 rows. The size (or number) of the columns 1-15 and the rows A-H may be configurable based on expected minimum/maximum size of the characters to be recognized. If the minimum/maximum sizes of the characters or the length of the character lines are not known, in some implementations the at least one processor may try localizing and classifying characters using different sets parameters for the columns and rows.

At 308, for each of the plurality of regions 402, the at least one processor may determine a characteristic value indicative of whether the region contains foreground (characters) or background. Such characteristic value may be determined by applying a function which depends on variance, energy, minimum grayscale level, and/or maximum grayscale level, for example. Advantageously, when a transition occurs in the image from an inter-line space to a line of characters ("character line"), or vice versa, the function values change significantly, which allows for identification of character line regions and inter-line regions between character lines. Generally, in order to not be affected by perspective deformation (e.g., skew or warped lines), lines are not traced horizontally through the entire width of the image (e.g., through columns A-H of the array 400 of FIGS. 4A-4B), but instead are traced column-by-column. The characteristic value (e.g., energy or variance) is thus calculated across each of the columns 1-15, or at least portions thereof.

As shown in FIG. 4A, the result of determining the plurality of characteristic values for the array 400 of regions 402 is a plurality of "dots" (variance values), where "white" (low variance) region dots are likely to correspond to inter-line regions and "black" (high variance) region dots are likely to correspond to characters.

At 310, the at least one processor analyzes the determined characteristic values of the regions 402 to identify one or more character lines. Generally, the at least one processor attempts to connect black dots (e.g., region 5B, region 6B) belonging to different columns to form character lines. More specifically, the at least one processor identifies "edges," which are points where black/white transitions are found, and attempts to connect such identified edges.

As a column is scanned from top to bottom, transitions from low variance to high variance signify a top of a character line, and transitions from low variance to high variance signify a bottom of a character line. If the character lines in an image are horizontal with respect to the expected input orientation, the transitions for each of the columns A-H will be more or less the same. However, if the character lines are oriented at an angle, the edges in the rows in one column (e.g., column 2) will be higher or lower than the edges in the rows in an adjacent column (e.g., column 1).

As noted above, the at least one processor may consider the transitions in each column and may try to match the transitions with transitions in adjacent columns. For example, the at least one processor may try to match transitions in column 1 with transitions in column 2, match transitions in column 2 with transitions in column 3, and so on. The matched transitions should have the same orientation or "sign" (e.g., low to high transition, high to low transition).

FIG. 4A shows a plurality of lines 404A-404F (collectively, lines 404) which each may be generated based on the matched edges between adjacent columns. Each of the plurality of lines 404 represents a candidate direction or orientation for the lines of characters in the image. There may be many candidate directions, one for each pair of edges in adjacent columns with the same sign. The at least one processor may produce real edges which should be retained, and edges which are noise which should be discarded. For each candidate line 404, a score may be generated which indicates a likelihood that the direction represented by the line is the actual direction of the lines of characters in the image.

In FIG. 4A, the shaded "black" boxes represent regions determined to likely contain foreground (characters). FIG. 4B shows a text box 1 and a text box 2 surrounding the black boxes which the at least one processor has determined to comprise lines of characters. As shown in FIG. 4B, there are also noisy regions (e.g., regions 2D, 7E, 11D and 14D) which do not belong to either of text box 1 or text box 2.

As shown in FIG. 4A, the at least one processor has identified the plurality of lines 404 which each represent a candidate direction for the lines of characters. In column 1, the lines 404A and 404F are real edges because such lines separate the bottom of a character line from an inter-line space or zone. However, the lines 404B-404E are not real edges and, as such, are false positives.

The at least one processor may determine which direction is the real and best direction from all of the possible directions. This may be achieved by counting the number of same sign edges which each of the candidate direction lines encounter on its respective path across the columns. For example, the line 404A encounters edges of the same sign at columns 1, 3, 5, 6, 10, 12, and 15. Similarly, the line 404F encounters edges of the same sign at columns 1, 3, 5, 8, 10, 12, and 14. Thus, the vote or score for lines 404A and 404F will be relatively high. In contrast, the lines 404B-404E encounter relatively few same sign edges across the columns. Accordingly, the vote or score for the directions represented by the lines 404B-404E will be relatively low.

In some implementations, the scores for similar candidate directions may be summed or merged. For example, the scores for the horizontal lines 404A and 404F may be summed, so the total score for the horizontal direction represented by these lines will become even greater than other scores. Thus, in the end the at least one processor generates a vote or score for each of the directions which were found, possibly merging the similar directions (e.g., within 10 degrees bands).

The at least one processor may select the highest score as the most probable direction for the character lines. In some implementations, the number of directions evaluated may depend on the number of transitions with the same sign found in the image. In some implementations, the at least one processor may evaluate directions which are +/−30° with respect to the expected input direction. Once the direction of the character lines has been found, the at least one processor knows where characters are located and where background areas are located, as indicated by text boxes 1 and 2 shown in FIG. 4B.

Figure 5:
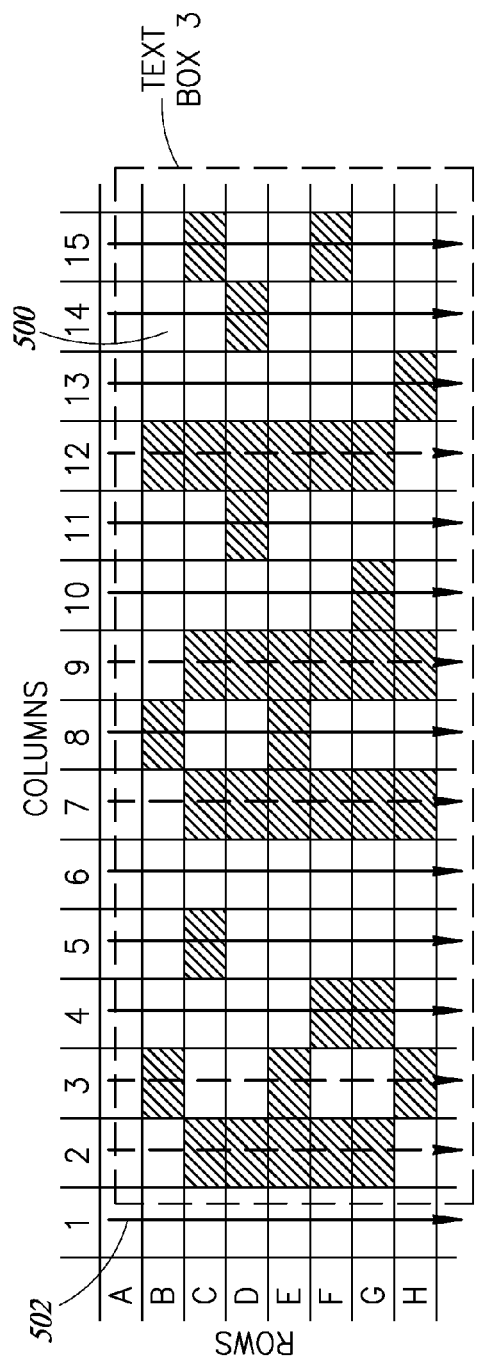
FIG. 5 is a diagram of a two-dimensional array of regions for a line of characters in an image which shows the summation of variance levels for a plurality of columns in the array used to determine inter-character spacing between characters in the line of characters, according to one illustrated implementation.
Figure 6:
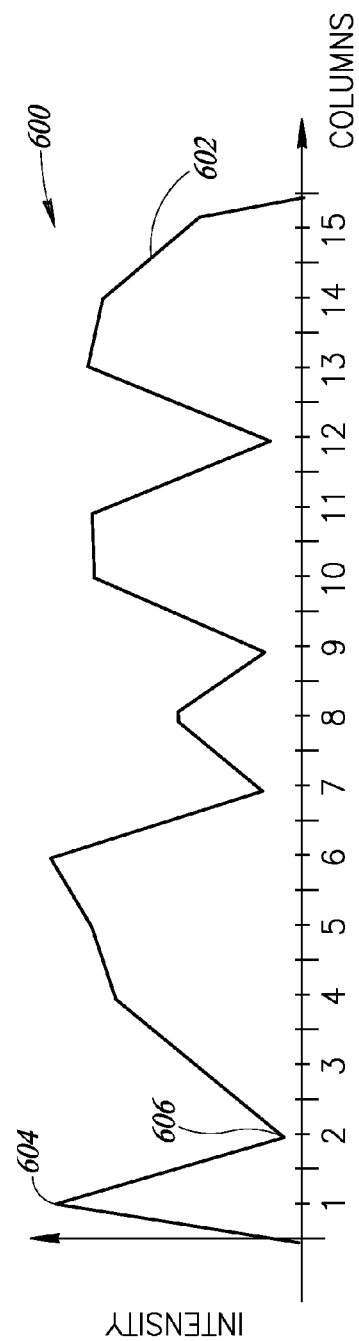
FIG. 6 is a graph which shows intensity levels for columns of regions in the array of FIG. 5, according to one illustrated implementation.

At 312, the at least one processor analyzes the determined characteristic values for the regions within each line of characters to determine a probable inter-character spacing for each line. FIGS. 5 and 6 illustrate one possible implementation of this act. In particular, FIG. 5 shows a text box 3 for a character line which includes a plurality of regions 500. FIG. 6 shows a graph 600 of a variance/intensity profile 602 for each of the columns 1-15 of the text box 3 of FIG. 5.

Generally, the at least one processor may sample the text box 3 containing the character line horizontally with respect to the determined orientation for the text box. The at least one processor may analyze the text box 3 to find the edge-to-edge transitions, which include the transitions in which the signals move from low to high, and the transitions in which the signals move from high to low. Each of the transitions corresponds to a transition from a background area (inter-character gap) to the foreground character, or from the foreground character to a background area. The at least one processor calculates the distances between adjacent transitions of the same sign. Each of the calculated distances represents a candidate inter-character spacing. The at least one processor may identify the most frequently occurring of such distances, and may determine such distance is the probable inter-character spacing for a particular character line.

In the text box 3 shown in FIG. 5, a vertical set of scan lines 502 is used to generate a plurality of summed intensity values. It is noted that the text box may be oriented with a generic angle, so the term "vertical" is used with respect to the angle of the text box. Such allows for decoding of characters in an omnidirectional way by simply attempting to localize and decode through several rotated regions (e.g., 0°, 30°, 45°, 60°, 90°). As shown in FIG. 6, the result is the signal or profile 602 which has greater values at the inter-character gaps between each character. As noted above, the at least one processor sums the vertical set of scan lines 502 using the previously determined orientation. Higher intensity values, represented as solid scan lines 502, correspond to a space between two characters, and lower values, represented as dashed scan lines 502, correspond to characters.

The at least one processor locates the frequency between the maximum values in the intensity profile 602, which provides the inter-character spacing. For example, in the graph 600 of FIG. 6, a first peak 604 corresponds to the sum of all the values in column 1 of FIG. 5. Since the regions in column 1 are all background areas (white), the sum is high. In column 2, there is a lot of foreground. Thus, the intensity value 606 for column 2 is much lower than the value 604 for column 1. Peaks correspond to inter-character gaps because characters are separated by background areas. In contrast, inside a character there are several foreground regions, so the summed intensity value is lower. It should be appreciated that using this method, the inter-character spaces do not need to be completely background areas. There can be some noise (e.g., block 5C, 10G, 13H), but since the at least one processor sums along the columns, the sum will still be high even with the noise. Further, using this method, inter-character spacing may be detected between characters that are touching (i.e., not fully separated by background), so long as the entire inter-character space is not foreground.

Referring to FIG. 6, the at least one processor may analyze the intensity profile 602 to find transitions between low values (foreground) to high values (background). The at least one processor may find the most frequent distance between corresponding values. Descending edges correspond to transitions from background to foreground, while ascending edges correspond to transitions from foreground to background. In some implementations, the at least one processor may consider all same sign transitions (e.g., descending transitions from columns 1-2, 6-7 and 11-12). The distances or widths of those same sign transitions correspond to the inter-character spacing. The at least one processor may determine the most frequently occurring inter-character spacing or width, which is the one with agrees with most of the characters in the line of characters. Thus, the at least one processor has identified character lines in the image, inter-line spacing, candidate dimensions of character boxes, and probable inter-character spacing.

At 314, the at least one processor identifies a starting character region in each of the identified character lines based at least in part on the determined characteristic values and the determined probable inter-character spacing. To achieve such, the at least one processor may use the same signal used to find the probable inter-character spacing. More specifically, the at least one processor may look at which of the characters in a character line agrees most with the determined probable inter-character spacing. For example, if the at least one processor determines that the most frequent inter-character spacing is 13 regions, the at least one processor may look at the distances between the same sign transitions and determine which of them is most similar to 13. In some implementations, for each candidate starting character box or region, the at least one processor checks the position of the end of a previous character region relative to the position of the end of the candidate character region, and also checks the position of the start of a next character region relative to the position of the start of the candidate character region. The candidate character region which has an inter-character spacing which is the most similar to the determined probable inter-character spacing is selected as the starting character region.

Once the at least one processor has identified a starting character region or box, the at least one processor may position a pointer in the middle of the region. At this point, in some implementations the text box (e.g., text boxes 1 and 2 of FIG. 4B) around the character line may be discarded.

At 316, the at least one processor recognizes the character within the starting character box. In some implementations, the starting character box may first be refined by looking for edges of the character to generate a refined box which only contains the extent of the character to be recognized. As discussed above, a character box may be a generic shape of a number (e.g., 4) of sides, dependent on the tilt, skew, geometric distortion, etc., of the character. Such allows for high performance classification even under poor acquisition conditions.

Figure 7:
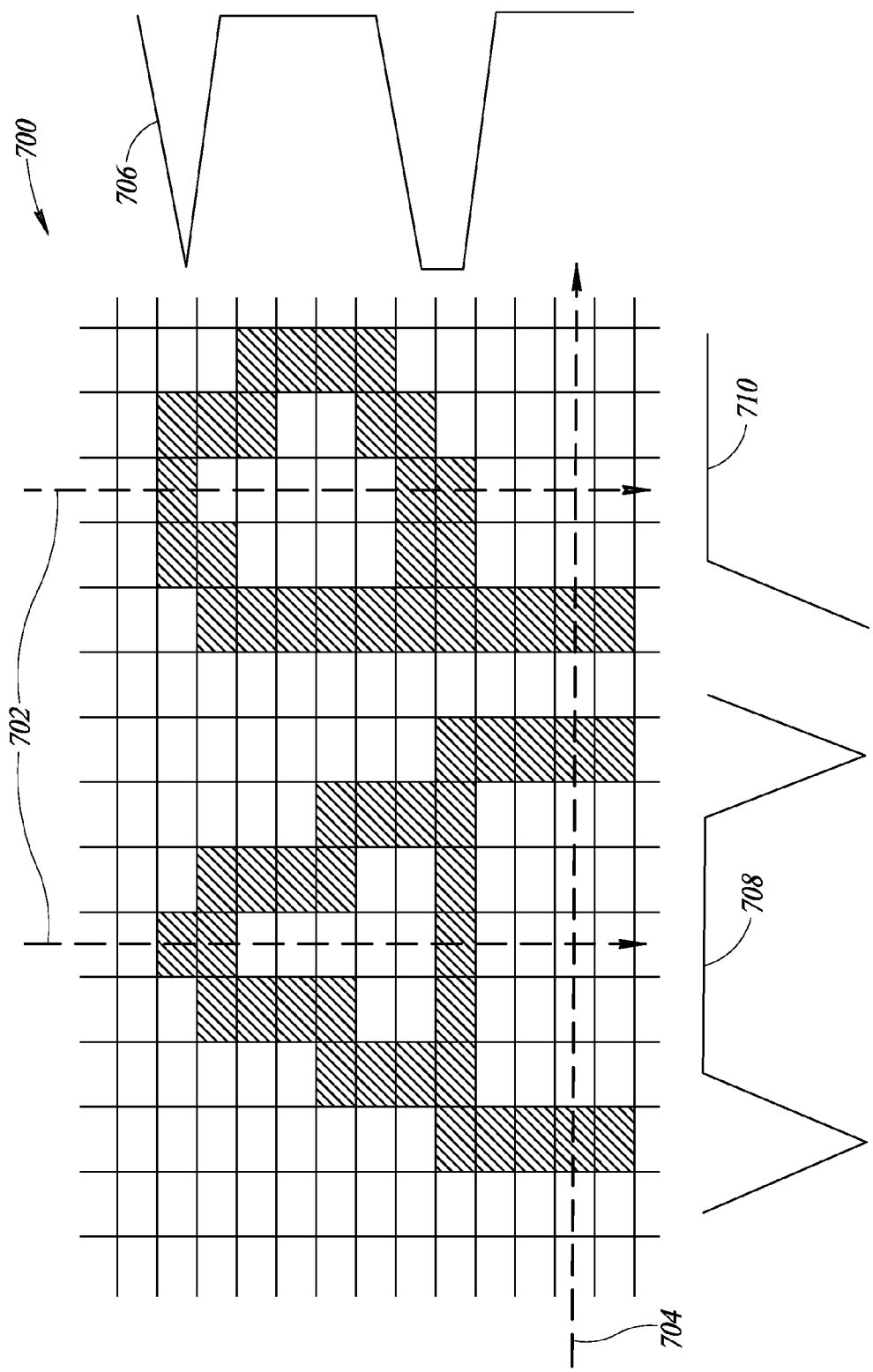
FIG. 7 is a schematic diagram of two characters which are classified using a decision tree classifier which implements progressive horizontal and vertical scans, according to one illustrated implementation.

The starting character within the refined box may be classified using any suitable classifier. FIG. 7 shows an example implementation of a binary decision tree classifier which utilizes progressive scans to classify characters "A" and "P" in an array 700. For example, a first scan, indicated by arrows 702 in the center of the illustrated characters "A" and "P," looks for a specific sequence of edges in the vertical direction of the character which is compatible with both the characters "A" and "P," but not compatible with the characters "O" and "T." A vertically oriented graph line 706 depicts the edges found for the characters "A" and "P" by the first scan. A second scan, indicated by an arrow 704, is in the horizontal direction near the bottom of the characters "A" and "P." Horizontally oriented graph lines 708 and 710 depict the edges found during the second scan for the characters "A" and "P," respectively. Through the horizontal scan, a signal which is compatible with the character "A" but not with the character "P" may be identified, thus unequivocally identifying the characters "A" and "P."

Generally, at each branch in the binary decision tree classifier, the at least one processor tries to narrow down the possible characters starting from all possible characters and traversing the tree until a leaf node is reached. If no character is determined, the at least one processor may report that no character was recognized.

In some implementations, each of the branches in the decision tree may also output a confidence level. For example, a particular vertical scan may output that 4 edges were detected with a confidence level of 70%. The at least one processor may determine whether the overall confidence of at end of the decision tree is above a threshold. If the confidence level is below the threshold, the at least one processor may report that no character was recognized. Alternatively, the at least one processor may back up on the classification tree, find the decision point with the lowest confidence level, take the other branch, and reclassify. If the final confidence level taking the alternative path is higher than the confidence level of the previously traversed path, the at least one processor may choose the decision with the higher confidence level as the result. Or, if the second final confidence level is also below the threshold, the at least one processor may report that no character was recognized.

At 318, the at least one processor may determine the locations of adjacent character regions within each character line. The at least one processor may start from the high quality starting character determined at 314 and estimate the size and location of the box enclosing the next neighbor, to the left or right of the starting character, based on the determined probable inter-character spacing and the starting character box size. In some implementations, after the starting character has been classified, the starting character box may be refined knowing the specific classified character. Such allows for more accurate estimation of the location of adjacent characters, especially when the classified character has an unusual width (e.g., the character "i").

At 320, the at least one processor recognizes characters within adjacent regions for each character line until all of the characters have been recognized. For example, the at least one processor may move one character box to the left of the starting character for the line. The at least one processor may refine the box for that character to produce a refined box which encompasses only the extent of the character. The at least one processor may input the refined box into a suitable classifier, as discussed above. The at least one processor may refine the character box for the classified character based on the determined specific classified character. The at least one processor may continue moving to the left, locating and classifying characters, until the left end of the character line is reached. Then, the at least one processor may move one character box to the right of the starting character and repeat the process or locating and classifying characters until the right end of the character line is reached. The at least one processor may repeat this procedure for all identified character lines in the image.

Using the implementations discussed herein, the size and position of lower quality characters are estimated based on the knowledge about box size and orientation for higher quality characters, thus reducing errors. Existing methods first estimate all character boxes, and then classify the characters. In contract, one or more implementations discussed herein first estimate "best" boxes, then classify characters, then bounce back to estimate adjacent boxes, then classify again, and so on. Advantageously, using such implementations it is significantly easier to follow curved or inclined text, and to correct perspective distortion, because box size is not determined beforehand, thus the process dynamically corrects box size and orientation.

Further, even if the inter-character spacing is not constant, the implementations discussed herein can adapt to the variable inter-character spacing since only one character is processed at a time after an adjacent character has been processed. Advantageously, the implementations discussed herein are also able to detect characters which are merged together without background space (e.g., white space) between them. For example, if there are two adjacent characters which are connected, the implementations discussed herein separate the two characters since where each character should be positioned is known.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof, any of which may be referred to herein as one or more processors. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computer systems, microcontrollers, microprocessors, digital signal processors, graphics processing units, as firmware, or as virtually any combination thereof, and that designing the circuitry and/or writing the code for the software and or firmware to implement one or more processors or controllers would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An image processor system, comprising:
at least one processor; and
at least one nontransitory processor-readable storage medium communicatively coupled to the at least one processor and which stores at least one of processor-executable instructions or data, wherein in use the at least one processor:
 receives an image file from the at least one nontransitory processor-readable storage medium, the image file comprising a two-dimensional array of pixels, each of the pixels having a pixel value;
 partitions the image file into a two-dimensional array of regions comprising a plurality of rows and a plurality of columns, each of the regions comprising a plurality of the pixels;
 for each region, determines a characteristic value indicative of whether the region contains foreground or background;
 analyzes the determined characteristic values of the regions to identify a number of candidate directions or orientations for straight lines of characters in the image;
 selects one of the number of candidate directions or orientations for straight lines of characters in the image based at least in part on the analyzed determined characteristic values of the regions to identify one or more lines of characters;
 for each line of the identified one or more lines of characters,
  analyzes the determined characteristic values for the regions within the line to determine a probable inter-character spacing, wherein, to analyze the determined characteristic values, the at least one processor:
   sums the characteristic values of the regions within each column within the line to generate an intensity profile for the line; and
   analyzes the intensity profile to determine the probable inter-character spacing, wherein to analyze the intensity profile, the at least one processor:
    analyzes the intensity profile to identify transitions between foreground and background;
    determines a most frequent distance between the identified transitions between foreground and background; and
    selects the determined most frequent distance as the probable inter-character spacing;
  identifies a starting character region based at least in part on the determined characteristic values and the determined probable inter-character spacing; and
  recognizes a character within the starting character region.

2. The image processor system of claim 1 wherein the at least one processor:
 for each line of the identified one or more lines of characters,
  identifies an adjacent character region which is adjacent the starting character region based at least in part on the determined probable inter-character spacing; and
  recognizes a character within the adjacent character region.

3. The image processor system of claim 1 wherein the at least one processor:
 for each line of the identified one or more lines of characters,
  iteratively identifies character regions adjacent a previously identified character region based at least in part on the determined probable inter-character spacing and a location of the previously identified character region; and
  recognizes a character within each of the identified character regions.

4. The image processor system of claim 1 wherein the at least one processor:
 for each column, analyzes the determined characteristic values of the regions in the column to identify transitions between foreground and background; and
 compares the identified transitions in adjacent columns to identify the one or more lines of characters.

5. The image processor system of claim 4 wherein the at least one processor:
 compares the identified transitions in adjacent columns to identify a probable angle of orientation for the identified one or more lines of characters.

6. The image processor system of claim 1 wherein the at least one processor:
 for each line of the identified one or more lines of characters,
  analyzes the determined characteristic values to detect transitions between foreground and background; and
  compares the detected transitions with the determined probable inter-character spacing to identify the starting character region.

7. The image processor system of claim 1 wherein the at least one processor:
 inputs image data corresponding to the starting character region into a trained classifier to recognize a character within the starting character region.

8. A method of operation in an image processor system for recognizing one or more characters in an image file, the image file comprising a two-dimensional array of pixels, each of the pixels having a pixel value, the method comprising:
 receiving, by at least one processor, the image file from at least one nontransitory processor-readable storage medium communicatively coupled to the at least one processor;
 partitioning, by the at least one processor, the image file into a two-dimensional array of regions comprising a plurality of rows and a plurality of columns, each of the regions comprising a plurality of the pixels;

for each region, determining, by the at least one processor, a characteristic value indicative of whether the region contains foreground or background;

analyzing, by the at least one processor, the determined characteristic values of the regions to identify a number of candidate directions or orientations for straight lines of characters in the image;

selecting, by the at least one processor, one of the number of candidate directions or orientations for straight lines of characters in the image based at least in part on the analyzed determined characteristic values of the regions to identify one or more lines of characters;

for each line of the identified one or more lines of characters, analyzing, by the at least one processor, the determined characteristic values for the regions within the line to determine a probable inter-character spacing, wherein analyzing the determined characteristic values comprises:

summing, by the at least one processor, the characteristic values of the regions within each column within the line to generate an intensity profile for the line; and analyzing, by the at least one processor, the intensity profile to determine the probable inter-character spacing, wherein analyzing the intensity profile comprises:

analyzing, by the at least one processor, the intensity profile to identify transitions between foreground and background;

determining, by the at least one processor, a most frequent distance between the identified transitions between foreground and background; and selecting, by the at least one processor, the determined most frequent distance as the probable inter-character spacing;

identifying, by the at least one processor, a starting character region based at least in part on the determined characteristic values and the determined probable inter-character spacing; and recognizing, by the at least one processor, a character within the starting character region.

9. The method of claim 8, further comprising:

for each line of the identified one or more lines of characters, identifying, by the at least one processor, an adjacent character region which is adjacent the starting character region based at least in part on the determined probable inter-character spacing; and recognizing, by the at least one processor, a character within the adjacent character region.

10. The method of claim 8, further comprising:

for each line of the identified one or more lines of characters, iteratively identifying, by the at least one processor, character regions adjacent a previously identified character region based at least in part on the determined probable inter-character spacing and a location of the previously identified character region; and recognizing, by the at least one processor, a character within each of the identified character regions.

11. The method of claim 8 wherein analyzing the determined characteristic values of the regions comprises:

for each column, analyzing, by the at least one processor, the determined characteristic values of the regions in the column to identify transitions between foreground and background; and comparing, by the at least one processor, the identified transitions in adjacent columns to identify the one or more lines of characters.

12. The method of claim 11, further comprising:

comparing, by the at least one processor, the identified transitions in adjacent columns to identify a probable angle of orientation for the identified one or more lines of characters.

13. The method of claim 8 wherein identifying a starting character region comprises:

for each line of the identified one or more lines of characters, analyzing, by the at least one processor, the determined characteristic values to detect transitions between foreground and background; and comparing, by the at least one processor, the detected transitions with the determined probable inter-character spacing to identify the starting character region.

14. The method of claim 8 wherein recognizing a character within the starting character region comprises inputting, by the at least one processor, image data corresponding to the starting character region into a trained classifier to recognize a character within the starting character region.

15. An image processing system, comprising:

at least one processor; and at least one nontransitory processor-readable storage medium communicatively coupled to the at least one processor and which stores at least one of processor-executable instructions or data, wherein in use the at least one processor:

partitions an image file into a two-dimensional array of regions comprising a plurality of rows and a plurality of columns, each of the regions comprising a plurality of pixels each including a pixel value;

for each region, determines a characteristic value indicative of whether the region contains foreground or background;

for each column, analyzes the determined characteristic values of the regions in the column to identify transitions between foreground and background;

compares the identified transitions in adjacent columns to identify one or more candidate directions or orientations for straight lines of characters in the image;

analyzes the identified transitions in adjacent columns to select one of the one or more candidate directions or orientations for straight lines of characters in the image to identify one or more lines of characters;

for each line of the identified one or more lines of characters, analyzes the determined characteristic values to detect transitions between foreground and background, the transitions being horizontal with respect to the identified probable angle of orientation for the identified one or more lines of characters;

analyzes the transitions between foreground and background to determine a probable inter-character spacing, wherein, to analyze the transitions, the at least one processor:

sums the characteristic values of the regions within each column within the line to generate an intensity profile for the line; and analyzes the intensity profile to determine the probable inter-character spacing, wherein, to analyze the intensity profile, the at least one processor:

analyzes the intensity profile to identify transitions between foreground and background;
determines a most frequent distance between the identified transitions between foreground and background; and
selects the determined most frequent distance as the probable inter-character spacing;
compares the detected transitions with the determined probable inter-character spacing to identify a starting character region; and
recognizes a character within the starting character region.

16. The image processor system of claim 15 wherein the at least one processor:
for each line of the identified one or more lines of characters,
identifies an adjacent character region which is adjacent the starting character region based at least in part on the determined probable inter-character spacing; and
recognizes a character within the adjacent character region.

17. The image processor system of claim 15 wherein the at least one processor:
for each line of the identified one or more lines of characters,
iteratively identifies character regions adjacent a previously identified character region based at least in part on the determined probable inter-character spacing and a location of the previously identified character region; and
recognizes a character within each of the identified character regions.

18. The image processor of claim 15 wherein the at least one processor:
inputs image data corresponding to the starting character region into a trained classifier to recognize a character within the starting character region.

\* \* \* \* \*

UNITED STATES PATENT AND TRADEMARK OFFICE
CERTIFICATE OF CORRECTION

PATENT NO. : 9,798,948 B2
APPLICATION NO. : 14/815741
DATED : October 24, 2017
INVENTOR(S) : Francesco Deppieri et al.

Page 1 of 1

It is certified that error appears in the above-identified patent and that said Letters Patent is hereby corrected as shown below:

On the Title Page

Item (56), U.S. Patent Documents:
--8,348,169 01/2013 Wang et al.-- is missing.

In the Claims

Column 15, Line 60:
"probable inter-character spacing, wherein to"
Should read:
--probable inter-character spacing, wherein, to--.

Signed and Sealed this
Twenty-eighth Day of August, 2018

Andrei Iancu
*Director of the United States Patent and Trademark Office*